(No Model.)
H. WALKER.
SHOCK COVER FOR GRAIN, &c.
No. 559,010.                Patented Apr. 28, 1896.
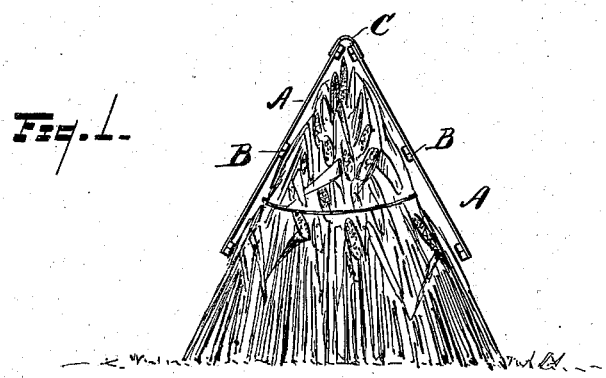
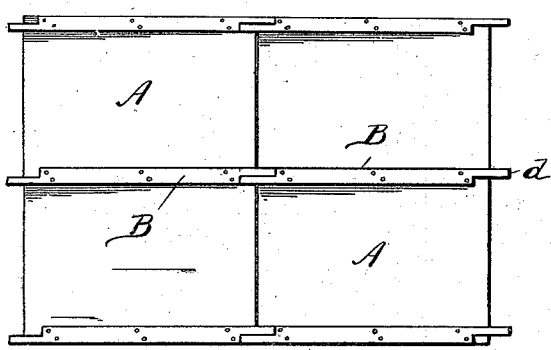
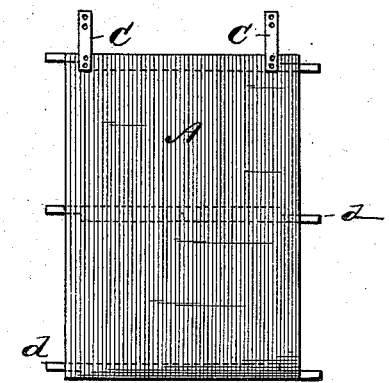
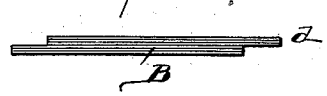
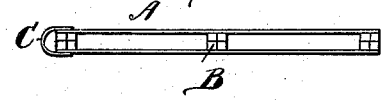
WITNESSES                INVENTOR
Hiram Walker
by H. F. Eberts
Attorney

UNITED STATES PATENT OFFICE.

HIRAM WALKER, OF ISLE AUX PECHES, CANADA.

SHOCK-COVER FOR GRAIN, &c.

SPECIFICATION forming part of Letters Patent No. 559,010, dated April 28, 1896.

Application filed February 29, 1896. Serial No. 581,390. (No model.)

*To all whom it may concern:*

Be it known that I, HIRAM WALKER, a citizen of the United States, residing at Isle aux Peches, in the county of Essex, Province of Ontario, Canada, have invented a new and useful Cover for Shocks of Corn or Grain, of which the following is a specification.

My invention relates to an improvement in covers for corn-shocks, the object I have in view being to protect the fodder from the action of the elements while curing in the field.

As is well known, the stalks, leaves, and husks of corn contain a large percentage of nutritious juices, which would be a valuable food for live stock if these juices could be saved. In the ordinary way of harvesting and curing corn after cutting it is customary to shock the corn in the field, where it is exposed to rain, dews, and snow, which leach out the major portion of the succulent juices while the corn is drying and getting in condition for husking. The residue, commonly called "fodder," consequently has but little value. If the corn, soon after cutting, be husked out, and the fodder be stored in barns or other inclosures while containing even a small percentage of moisture, the interior of the stored mass will heat, the fodder will be spoiled from fermentation, and the live stock will refuse it. On the other hand, if the shocked corn can be protected from the elements while curing, these nutritious juices will be saved and furnish a food of great value, equal to the best hay, and the fodder, after husking, can be stored, if desired, without danger of heating.

To this end my invention consists in the novel and cheap construction of thin covering-boards, adapted to protect the corn in shocks, as more fully hereinafter set forth.

Figure 1 is an end elevation of a shock of corn having my covers thereon. Fig. 2 is an exterior elevation of a cover. Fig. 3 is an elevation showing a pair of these covers in juxtaposition. Fig. 4 is a side elevation of a slat or batten. Fig. 5 is an edge elevation of a pair of covers lying flat on the ground. Fig. 6 is a detail view of a soft-steel ribbon or strip used to hinge the boards together.

Like letters refer to like parts in the several figures.

In the drawings, A represents a sheet of wood veneer, which may be three feet wide and four feet long by three-sixteenths of an inch thick.

B B B are light wood battens riveted across the middle and both ends of the board to stiffen it and to prevent warping. These battens are longer than the board is wide and the projecting ends $d$ are halved, so as to interlock with similar projections on other covers and form a scarf-joint that will support the covers in position and in line.

The covers are hinged together in pairs in the following manner: A thin strip C of very soft and tough decarbonized steel, which may be six inches long and an inch wide, is nailed or riveted longitudinally at and to the head of each board, say six inches from each side. The other end of each strip is in like manner nailed to the head of the other board in such a way as to leave about an inch of opening between the head ends when thrown over a shock, as in Fig. 1. This space permits the vapors to pass out of the corn below, facilitates a free circulation of air under the covers, and allows the covers to be folded flat together, as seen in Fig. 5, for transportation and storage.

The covers being made of very thin lumber (cut veneers) are light and cheap, much cheaper in fact than the canvas tarpaulins sometimes used for this purpose and far more durable. When properly seasoned, and before hinging the parts together, I coat them with hot asphaltum or other black waterproof paint or compound, which serves a double purpose—first, to prevent the absorption of moisture, with its evil results, and, second, the black color of the covers retains and transmits the heat of the sun's rays to the covered corn below, thereby hastening the evaporation of its liquids.

These covers being light and compact are easily transported in the field, quickly applied, and after use are easily gathered up and stored.

While these covers may be applied singly to the ordinary round shocks, the best results are got by putting up the cut corn in long shocks or by standing round bunches close together in line, thus making a long shock. The steel strips described may be bent back and forth hundreds of times without breaking; but any other form of hinge may be used in place thereof.

What I claim for my invention, and desire to secure by Letters Patent, is—

The herein-described shock-cover consisting of two sheets of wood veneer hinged together end to end, stiffened by battens transversely riveted thereto, and having projecting ends scarfed to interlock with similar projections on other covers, and the whole coated with a waterproof material, substantially as described.

HIRAM WALKER.

Witnesses:
JOSEPH P. GOODRICH,
ALFRED BROWN.